United States Patent
Hwang et al.

(10) Patent No.: US 12,351,679 B2
(45) Date of Patent: Jul. 8, 2025

(54) CRYSTALLINE POLYESTER RESIN AND MANUFACTURING METHOD THEREOF

(71) Applicant: SK CHEMICALS CO., LTD., Gyeonggi-do (KR)

(72) Inventors: Da-Young Hwang, Gyeonggi-do (KR); Hyun-Woo Oh, Gyeonggi-do (KR); Yoo Jin Lee, Gyeonggi-do (KR)

(73) Assignee: SK CHEMICALS CO., LTD., Gyeonggi-do (KR)

( * ) Notice: Subject to any disclaimer, the term of this patent is extended or adjusted under 35 U.S.C. 154(b) by 0 days.

(21) Appl. No.: 18/870,637

(22) PCT Filed: Jul. 16, 2024

(86) PCT No.: PCT/KR2024/010194
§ 371 (c)(1),
(2) Date: Nov. 29, 2024

(87) PCT Pub. No.: WO2025/028855
PCT Pub. Date: Feb. 6, 2025

(65) Prior Publication Data
US 2025/0171588 A1     May 29, 2025

(30) Foreign Application Priority Data
Jul. 31, 2023 (KR) .................. 10-2023-0099519

(51) Int. Cl.
*C08G 63/672* (2006.01)
*C08G 63/90* (2006.01)

(52) U.S. Cl.
CPC .......... *C08G 63/672* (2013.01); *C08G 63/90* (2013.01)

(58) Field of Classification Search
USPC ........................................ 528/196, 198, 296
See application file for complete search history.

(56) References Cited

FOREIGN PATENT DOCUMENTS

| | | |
|---|---|---|
| JP | 1995-108528 A | 4/1995 |
| JP | H07108528 A | 4/1995 |
| JP | 2005-206676 A | 8/2005 |
| JP | 2022-077583 A | 5/2022 |
| KR | 10-1994-0003877 B1 | 5/1994 |
| KR | 10-2009-0111823 A | 10/2009 |
| KR | 10-2017-0015878 A | 2/2017 |

OTHER PUBLICATIONS

International Search Report and Written Opinion for International Patent Application No. PCT/KR2024/010194 issued by the International Searching Authority on Oct. 23, 2024.
Notice of Allowance for Korean Patent Application No. 10-2023-0099519 issued by Korean Intellectual Property Office on Apr. 3, 2024.
International Search Report for International Patent Application No. PCT/KR2024/010194 issued by the International Searching Authority on Oct. 23, 2024.

*Primary Examiner* — Terressa Boykin
(74) *Attorney, Agent, or Firm* — IP & T GROUP LLP

(57) ABSTRACT

The present invention relates to a crystalline polyester resin and to a process for preparing the same. Since the crystalline polyester resin has a crystallinity required in a molding process and/or a recycling process while fusion is minimized during the preparation process, it can have excellent productivity, moldability, recyclability, and the like.

20 Claims, 1 Drawing Sheet

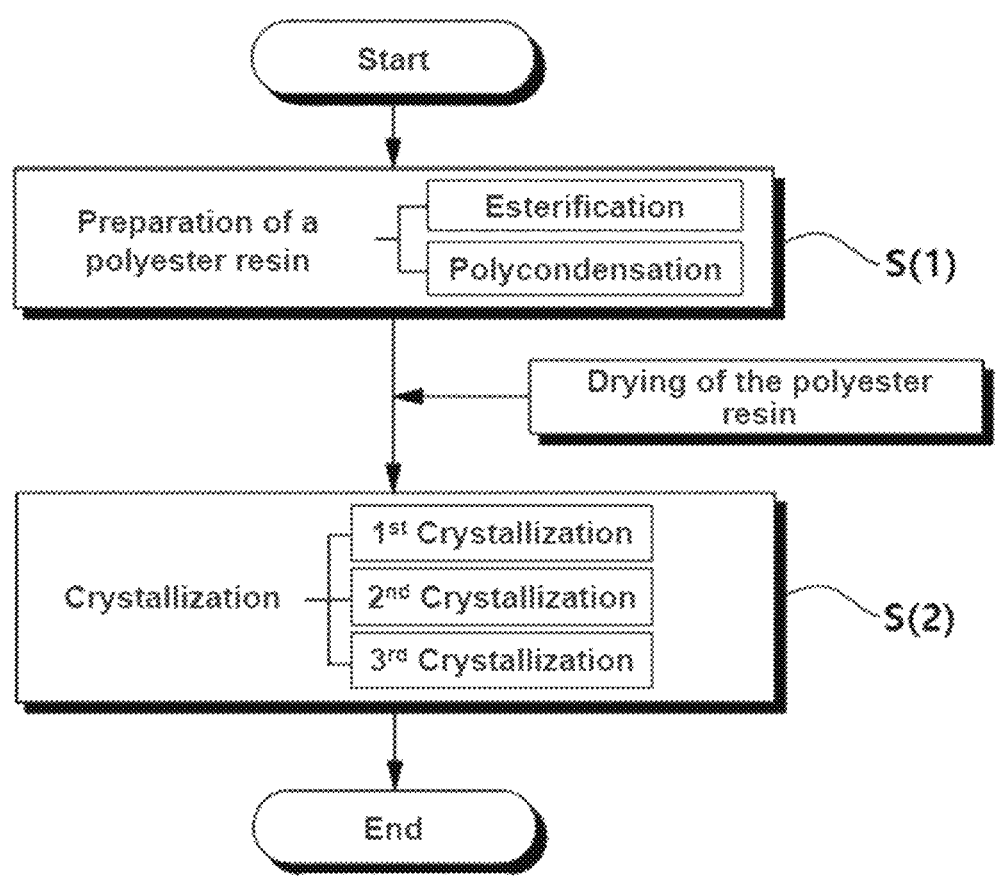

CRYSTALLINE POLYESTER RESIN AND MANUFACTURING METHOD THEREOF

This application is a national stage application of PCT/KR2024/010194 filed on Jul. 16, 2024, which claims priority of Korean patent application number 10-2023-0099519 filed on Jul. 31, 2023. The disclosure of each of the foregoing applications is incorporated herein by reference in its entirety.

TECHNICAL FIELD

The present invention relates to a crystalline polyester resin with excellent moldability and recyclability by virtue of its controlled crystallinity and to a process for preparing the crystalline polyester resin.

BACKGROUND ART

Polyester resins are obtained by a polymerization reaction of a dicarboxylic acid component and a diol component. Since they do not contain substances harmful to the human body and are environmentally friendly, they are widely used in the manufacture of films, partitions, panels, packaging materials, containers, and the like. In particular, polyester films prepared using a polyester resin have high thermal resistance and an appropriate heat shrinkage rate; thus, they are suitable for packaging and/or labels for plastic containers such as PET bottles.

Meanwhile, the use of plastic containers makes real life convenient, whereas environmental problems are becoming very serious due to indiscriminate disposal or excessive use thereof. Accordingly, various methods for recycling waste plastic containers after use are being prepared.

The process of recycling waste plastic containers may be divided into a physical recycling process through washing and crushing and a chemical recycling process through a depolymerization process. However, in order to go through such a recycling process, a pretreatment operation of separating waste plastics by plastic type is required, which reduces the efficiency of the recycling process. For example, in order to recycle a PET bottle to which a polyester film is attached as a label, an operation of separating (removing) the polyester film from the PET bottle must be accompanied. This is attributed to the difference in crystallinity between the polyester resin contained in a polyester film and the PET component contained in a PET bottle, which makes the recycling process unworkable when the PET bottle with the polyester film attached is subjected to the recycling process.

Accordingly, attempts have been made to control the crystallinity of a polyester resin to prepare a polyester film having a crystallinity similar to that of a PET bottle. However, there is a limit to optimizing the crystallinity of such a polyester resin, and the productivity and processability of the crystalline polyester resin are low due to problems such as fusion that would occur between the polyester resins (e.g., polyester resin pellets) during the process of controlling crystallinity.

DISCLOSURE OF INVENTION

Technical Problem

In order to solve the above-mentioned problems in the prior art, the present inventors have conducted various studies. As a result, it has been discovered that, as the heat of fusion ($\Delta H$) at the melting temperature of a crystalline polyester resin is controlled, the crystallinity of the polyester resin can be optimized, whereby a crystalline polyester resin with excellent productivity, moldability, and recyclability is obtained.

Accordingly, an object of the present invention is to provide a crystalline polyester resin with an optimized crystallinity and a process for preparing the same.

Solution to Problem

In order to accomplish the above object, the present invention provides a crystalline polyester resin, which comprises a diol repeat unit derived from a diol component; and a dicarboxylic acid repeat unit derived from a dicarboxylic acid component, wherein, when the crystalline polyester resin is analyzed by differential scanning calorimetry (DSC) while the temperature is raised to 280° C. at a scan rate of 10° C./minute, two or more melting temperatures ($T_m$) appear, and the following Relationship 1 is satisfied:

$$4 < X/Y < 70 \qquad \text{[Relationship 1]}$$

In Relationship 1, X is the sum of the heats of fusion ($\Delta H$) at the melting temperatures appearing at 200° C. or higher, and Y is the sum of the heats of fusion ($\Delta H$) at the melting temperatures appearing at lower than 200° C.

In addition, the present invention provides a process for preparing a crystalline polyester resin, which comprises (1) polymerizing a diol component and a dicarboxylic acid component to prepare a polyester resin; and (2) subjecting the polyester resin to crystallization of one or more times, wherein, when the crystalline polyester resin is analyzed by differential scanning calorimetry (DSC) while the temperature is raised to 280° C. at a scan rate of 10° C./minute, two or more melting temperatures ($T_m$) appear, and the above Relationship 1 is satisfied.

In addition, the present invention provides an article, which is prepared from the crystalline polyester resin.

Advantageous Effects of Invention

The present invention can provide a crystalline polyester resin having a crystallinity required in a molding (post-processing) process and a recycling process. Thus, when an article (e.g., injection molded article) is prepared therefrom, or the prepared article is recycled, excellent moldability and recyclability can be achieved.

In addition, since the present invention prepares a crystalline polyester resin through one or more crystallization steps at an optimally controlled temperature in each step, it is possible to minimize the occurrence of fusion between polyester resins during the crystallization step. As a result, it is possible to enhance the productivity and processability of a crystalline polyester resin.

BRIEF DESCRIPTION OF DRAWING

FIG. 1 is a flow chart showing the procedure of preparing a crystalline polyester resin according to an embodiment of the present invention.

BEST MODE FOR CARRYING OUT THE INVENTION

Hereinafter, the present invention will be described in detail. The present invention herein is not limited to the disclosures given below, but it may be modified into various forms as long as the gist of the invention is not changed.

In the present specification, the term "comprising" is intended to specify a particular characteristic, region, step, process, element, and/or component. It does not exclude the presence or addition of any other characteristic, region, step, process, element, and/or component, unless specifically stated to the contrary.

Throughout the present specification, the terms first, second, and the like are used to describe various components. But the components should not be limited by the terms. The terms are used for the purpose of distinguishing one element from another.

All numbers and expressions related to the quantities of components, reaction conditions, and the like used herein are to be understood as being modified by the term "about" unless otherwise indicated.

In general, a polyester resin prepared through extrusion and pelletization such as underwater cutting contains moisture. Therefore, when it is used to mold an article, it is necessary to remove the moisture contained in the polyester resin. If molding is carried out without removing the moisture, the quality of the article prepared through molding deteriorates due to a decrease in the degree of polymerization caused by a hydrolysis reaction by the moisture.

Accordingly, before a polyester resin is supplied to a molding step, a step of drying the polyester resin is carried out to remove moisture contained in the polyester resin. However, polyester resins mainly have amorphous surfaces; thus, there is a problem in that when they are put into a dryer to be dried, they would fuse with each other or stick to the inner walls of the dryer, which reduces the drying efficiency and productivity of the polyester resins.

To solve this problem, an attempt has been made to crystallize polyester resins to prevent fusion that would occur during the drying procedure. However, currently, there are limitations in optimizing the crystallinity of polyester resins.

In particular, if the crystallization of a polyester resin is insufficient, or, conversely, if it is excessively crystallized, the fusion problem mentioned above would not be solved. For example, when excessive crystallization occurs, that is, when the crystallization temperature is raised, melting of the polyester resin (e.g., polyester resin pellets) occurs between the exothermic temperature and the endothermic temperature, and the fusion ratio of the polyester resin increases (polyester resin pellets stick to each other). Further, the processing temperature of a polyester resin with crystallinity requires energy equivalent to the area of the melting temperature and the heat of fusion. Since a polyester resin crystallized in excess has a considerably high heat of fusion, a lot of energy is consumed in processing it, which reduces processability in post-processing. Thus, in order to improve the moldability of a crystalline polyester resin that has undergone a crystallization procedure, it is very important to control the melting temperature and heat of fusion of the crystalline polyester resin. In addition, in order to increase the recyclability of a polyester resin, it is also necessary to optimize the crystallinity of the polyester resin, which can also be achieved by controlling the melting temperature and heat of fusion of the polyester resin.

Based on the above, the present invention optimizes the crystallinity of a crystalline polyester resin obtained after crystallization without causing fusion between polyester resins during the crystallization procedure, thereby ensuring productivity, moldability (processability), and recyclability. For this purpose, it is characterized in that the preparation (crystallization) process of a crystalline polyester resin is controlled while the correlation between the melting temperature and heat of fusion of the crystalline polyester resin is specified, which will be explained in detail as follows.

Crystalline Polyester Resin

The crystalline polyester resin according to the present invention comprises a diol repeat unit derived from a diol component; and a dicarboxylic acid repeat unit derived from a dicarboxylic acid component, wherein, when the crystalline polyester resin is analyzed by differential scanning calorimetry (DSC) while the temperature is raised to 280° C. at a scan rate of 10° C./minute, two or more melting temperatures ($T_m$) appear, and the following Relationship 1 is satisfied.

$$4 < X/Y < 70 \qquad \text{[Relationship 1]}$$

In Relationship 1, X is the sum of the heats of fusion ($\Delta H$) at the melting temperatures appearing at 200° C. or higher in the DSC analysis, and Y is the sum of the heats of fusion ($\Delta H$) at the melting temperatures appearing at lower than 200° C. in the DSC analysis.

According to the present invention, when the crystalline polyester resin is analyzed by DSC, two or more (specifically, two or more, three or more, four or more, or two to three) melting temperatures ($T_m$) appear, and the above Relationship 1 is satisfied based on a specific temperature (melting temperature) of 200° C.; thus, its crystallinity can be optimized, resulting in excellent moldability and recyclability. The temperature of 200° C. may refer to the intermediate value between the crystallization temperature ($T_c$) and the melting temperature ($T_m$) of the crystalline polyester resin. As the temperature of this intermediate value is adopted, the amount of heat (melting temperature) required for crystallization and post-processing can be optimally controlled.

Specifically, the ratio of X/Y in Relationship 1 may be 4.1 to 69.9, 4.5 to 69.8, 5 to 69.7, 5.1 to 69.6, 5.3 to 69.5, 5.5 to 69, 5.8 to 68, 6 to 67, 6.3 to 66, 6.5 to 65, 6.8 to 60, 7 to 55, 7.5 to 50, 8 to 45, 8.5 to 40, 9 to 38, or 10 to 35. As the ratio of X/Y is controlled to the above range, a crystalline polyester resin having a desired crystallinity, along with minimized fusion, can be provided.

According to the present invention, in the crystalline polyester resin, the temperature range in which two or more melting temperatures ($T_m$) appear in the DSC analysis may be 140 to 245° C. More specifically, the two or more melting temperatures ($T_m$) may be 140 to 243° C., 140 to 242° C., 140 to 240° C., 140.1 to 239.5° C., 140.1 to 239° C., 140.2 to 238.7° C., 140.2 to 238.5° C., 141 to 238.3° C., 142 to 238° C., 145 to 237.5° C., 148 to 237° C., 150 to 236.8° C., 151 to 236.5° C., 153 to 236.3° C., 155 to 236° C., or 158 to 236° C. As the two or more melting temperatures ($T_m$) appear within the above temperature range, a crystalline polyester resin having a desired crystallinity can be provided.

In the DSC analysis of the crystalline polyester resin according to the present invention, one or more, two or more, or three or more melting temperatures may appear at a temperature of lower than 200° C., and one or more or two or more melting temperatures may appear at a temperature of 200° C. or higher.

Specifically, in the DSC analysis of the crystalline polyester resin, a first melting temperature ($T_{m1}$) may appear at a temperature of lower than 200° C., and a second melting temperature ($T_{m2}$) may appear at a temperature of 200° C. or higher. For example, in the DSC analysis of the crystalline polyester resin, a first-first melting temperature ($T_{m1-1}$) and a first-second melting temperature ($T_{m1-2}$) may appear at a temperature of lower than 200° C., and a second melting temperature ($T_{m2}$) may appear at a temperature of 200° C. or higher. Specifically, the first-first melting temperature ($T_{m1-1}$) may be 140 to 198° C., 141 to 195° C., 145 to 193° C., or 150 to 190° C. Specifically, the first-second melting temperature ($T_{m1-2}$) may be higher than 185 to 210° C., 187 to 205° C., 188 to 200° C., or 189 to 195° C. Specifically, the second melting temperature ($T_{m2}$) may be higher than 210 to 245° C., 215 to 243° C., 218 to 242° C., or 220 to 240° C.

According to the present invention, the difference ($|T_{m1}-T_{m2}|$) between the first melting temperature ($T_{m1}$) and the second melting temperature ($T_{m2}$) may be 40 to 105° C. Specifically, the difference ($|T_{m1}-T_{m2}|$) may be 43 to 105° C., 45 to 103° C., 48 to 103° C., 50 to 101° C., 52 to 99° C., 54 to 98.8° C., 54.5 to 98.5° C., 55 to 95° C., 56 to 93° C., 57 to 90° C., 57.5 to 85° C., 58 to 80° C., 59 to 75° C., or 60 to 70° C. When the first melting temperature ($T_{m1}$) is two or more, the lowest melting temperature among the two or more melting temperatures is deemed as the first melting temperature ($T_{m1}$), and when the second melting temperature ($T_{m2}$) is two or more, the highest temperature among the two or more melting temperatures is deemed as the second melting temperature ($T_{m2}$), in the calculation of the difference ($|T_{m1}-T_{m2}|$).

According to the present invention, when one or more melting temperatures appear at 200° C. or higher while the temperature is raised to 280° C. at a scan rate of 10° C./minute in the DSC analysis, X in Relationship 1 may refer to the sum ($\Delta H_{sum1}$) of the heats of fusion ($\Delta H$) at the respective melting temperatures. For example, if two melting temperatures of melting temperature a ($T_{ma}$) and melting temperature b ($T_{mb}$) appear at 200° C. or higher in the DSC analysis, X may be the sum ($\Delta H_a + \Delta H_b$) of the heat of fusion ($\Delta H_a$) at melting temperature a ($T_{ma}$) and the heat of fusion ($\Delta H_b$) at melting temperature b ($T_{mb}$). Here, if one melting temperature of melting temperature a ($T_{ma}$) appears at 200° C. or higher in the DSC analysis, X may be the value of the heat of fusion ($\Delta H_a$) itself at melting temperature a ($T_{ma}$). The X value (sum of the heats of fusion ($\Delta H$) at the melting temperatures appearing at 200° C. or higher) is not particularly limited, but it may be 20 J/g or more, specifically, 20.2 J/g or more, 23 J/g or more, 24 J/g or more, 25 J/g or more, 27 J/g or more, 29 J/g or more, 30 J/g or more, 31 J/g or more, 33 J/g or more, 35 J/g or more, 37 J/g or more, or 40 J/g or more (e.g., 20 to 39 J/g, 22 to 38 J/g, 24 to 37 J/g, or 25 to 35 J/g). As the X value is within the above range, a crystalline polyester resin having a desired crystallinity can be provided.

According to the present invention, when one or more melting temperatures appear at lower than 200° C. while the temperature is raised to 280° C. at a scan rate of 10° C./minute in the DSC analysis, Y in Relationship 1 may refer to the sum ($\Delta H_{sum2}$) of the heats of fusion ($\Delta H$) at the respective melting temperatures. For example, if two melting temperatures of melting temperature c ($T_{mc}$) and melting temperature d ($T_{md}$) appear at lower than 200° C. in the DSC analysis, Y may be the sum ($\Delta H_c + \Delta H_d$) of the heat of fusion ($\Delta H_c$) at melting temperature c ($T_{mc}$) and the heat of fusion ($\Delta H_d$) at melting temperature d ($T_{md}$). Here, if one melting temperature of melting temperature c ($T_{mc}$) appears at lower than 200° C. in the DSC analysis, Y may be the value of the heat of fusion ($\Delta H_c$) itself at melting temperature c ($T_{mc}$). The Y value (sum of the heats of fusion ($\Delta H$) at the melting temperatures appearing at lower than 200° C.) is not particularly limited, but it may be 0.1 to 10 J/g, specifically, 0.2 to 9.5 J/g, 0.3 to 9.3 J/g, 0.5 to 9 J/g, 1 to 8.5 J/g, 2.5 to 8 J/g, 3 to 7.8 J/g, 3.3 to 7.5 J/g, 3.5 to 7 J/g, 3.8 to 6.5 J/g, 4 to 6 J/g, 4.2 to 5.8 J/g, or 4.4 to 5.5 J/g. As the Y value is within the above range, a crystalline polyester resin having a desired crystallinity can be provided.

Meanwhile, according to the present invention, the crystalline polyester resin comprises a diol repeat unit derived from a diol component. The diol component is not particularly limited as long as it is a commonly known diol component. Specifically, it may comprise at least one (e.g., 2 or more, 3 or more, 4 or more, or 5 or more) selected from the group consisting of bis-2-hydroxyethyl terephthalate, isosorbide, neopentyl glycol, ethylene glycol, diethylene glycol, cyclohexanedimethanol, 1,2-propanediol, 1,3-propanediol, 2-methyl-1,3-propanediol, 2-methylene-1,3-propanediol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, 4-(hydroxymethyl)cyclohexylmethyl-4-(hydroxymethyl)cyclohexanecarboxylate (CHDM derivative), 4-(4-(hydroxymethyl)cyclohexylmethoxymethyl)cyclohexylmethanol (CHDM derivative), 2,2,4,4-tetramethyl-1,3-cyclobutanediol (TMCD), recycled bis-2-hydroxyethyl terephthalate, recycled isosorbide, recycled neopentyl glycol, recycled ethylene glycol, recycled diethylene glycol, and recycled cyclohexanedimethanol.

Here, the recycled bis-2-hydroxyethyl terephthalate, recycled isosorbide, recycled neopentyl glycol, recycled ethylene glycol, recycled diethylene glycol, and recycled cyclohexanedimethanol used as the diol component may refer to recycled raw materials (monomers) obtained by subjecting a waste polyester resin or a waste polyester article after use to a commonly known depolymerization process, but they are not limited thereto.

More specifically, the diol component may comprise at least one selected from the group consisting of a first diol component comprising ethylene glycol (EG), recycled ethylene glycol (r-EG), or a combination thereof; a second diol component comprising bis-2-hydroxyethyl terephthalate (BHET), recycled bis-2-hydroxyethyl terephthalate (r-BHET), or a combination thereof; and a third diol component comprising isosorbide (ISB), neopentyl glycol (NPG), diethylene glycol (DEG), cyclohexanedimethanol (CHDM), recycled isosorbide (r-ISB), recycled neopentyl glycol (r-NPG), recycled diethylene glycol (r-DEG), recycled cyclohexanedimethanol (r-CHDM), or a combination thereof.

The amount (amount added in the reaction) of the first diol component used is not particularly limited, but it may be 50 to 99% by mole, 60 to 99% by mole, 70 to 99% by mole, 70 to 98% by mole, 75 to 98% by mole, 75 to 97% by mole, or 80 to 90% by mole, based on the total percent by mole of the diol component. Accordingly, the crystalline polyester resin may comprise a repeat unit (a) derived from the first diol component. As the amount of the first diol component used is within the above range, a crystalline polyester resin with excellent basic physical properties can be produced economically.

The amount (amount added in the reaction) of the second diol component used is not particularly limited, but it may be 5 to 99% by mole, 5.5 to 95% by mole, 10 to 90% by mole, 15 to 80% by mole, 20 to 80% by mole, 25 to 75% by mole, or 30 to 70% by mole, based on the total percent by mole of the diol component. Accordingly, the crystalline polyester resin may comprise a repeat unit (b) derived from the second diol component. As the amount of the second diol component used is within the above range, it is possible to prepare a crystalline polyester resin having the required level of viscosity in a molding process. As a result, articles (molded articles) with excellent quality can be provided.

The amount (amount added in the reaction) of the third diol component used is not particularly limited, but it may be 20% by mole or less based on the total percent by mole of the diol component. Specifically, the amount of the third diol component used may be 1 to 20% by mole, 2 to 20% by mole, 2.5 to 19% by mole, 3 to 18% by mole, 3 to 17.5% by mole, 4 to 17% by mole, 4 to 16% by mole, or 4.5 to 15% by mole, based on the total percent by mole of the diol component. Accordingly, the crystalline polyester resin may comprise a repeat unit (c) derived from the third diol component. As the amount of the third diol component used is within the above range, a crystalline polyester resin with excellent basic physical properties, along with excellent moldability (processability), can be produced.

For example, when the basic physical properties and moldability (processability) of the crystalline polyester resin are taken into consideration, the amount of isosorbide or recycled isosorbide used among the third diol component may be 0 to 8% by mole, 0.1 to 6% by mole, 0.3 to 4% by mole, or 0.4 to 3.5% by mole, based on the total percent by mole of the diol component. In addition, the amount of diethylene glycol or recycled diethylene glycol used among the third diol component may be 0.5 to 10% by mole, 1 to 7% by mole, 1.5 to 5% by mole, or 2 to 4% by mole, based on the total percent by mole of the diol component. In addition, the amount of cyclohexanedimethanol or recycled cyclohexanedimethanol used among the third diol component may be 0 to 14% by mole, 1 to 12% by mole, 2 to 10% by mole, or 3 to 9% by mole, based on the total percent by mole of the diol component.

According to the present invention, the crystalline polyester resin comprises a dicarboxylic acid repeat unit derived from a dicarboxylic acid component. The dicarboxylic acid component is not particularly limited as long as it is a commonly known dicarboxylic acid component. Specifically, it may comprise at least one selected from the group consisting of terephthalic acid, isophthalic acid, dimethyl phthalate, dimethyl isophthalate, dimethyl terephthalate, phthalic acid, phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, azelaic acid, recycled terephthalic acid, recycled dimethyl terephthalate, recycled isophthalic acid, and recycled phthalic acid.

Here, the recycled terephthalic acid, recycled dimethyl terephthalate, recycled isophthalic acid, and recycled phthalic acid used as the dicarboxylic acid component may refer to recycled raw materials (monomers) obtained by subjecting a waste polyester resin or a waste polyester article after use to a commonly known depolymerization process, but they are not limited thereto.

More specifically, the dicarboxylic acid component may comprise at least one selected from the group consisting of a first dicarboxylic acid component comprising terephthalic acid (TPA), dimethyl phthalate, dimethyl isophthalate, dimethyl terephthalate (DMT), recycled terephthalic acid (r-TPA), recycled dimethyl terephthalate (r-DMT), or a combination thereof; and a second dicarboxylic acid component comprising isophthalic acid, phthalic acid, phthalic anhydride, 1,4-cyclohexane dicarboxylic acid, 1,3-cyclohexane dicarboxylic acid, dimethyl 1,4-cyclohexane dicarboxylate, dimethyl 1,3-cyclohexane dicarboxylate, recycled isophthalic acid, recycled phthalic acid, or a combination thereof.

The amount (amount added in the reaction) of the first dicarboxylic acid component used is not particularly limited, but it may be 95% by mole or more, 96% by mole or more, 97% by mole or more, 98% by mole or more, or 99% by mole or more (e.g., 95 to 100% by mole, greater than 95 to 100% by mole, 96 to 99.5% by mole, 97 to 99% by mole, or 98 to 98.5% by mole), based on the total percent by mole of the dicarboxylic acid component. Accordingly, the crystalline polyester resin may comprise a repeat unit (z) derived from the first dicarboxylic acid component.

The amount (amount added in the reaction) of the second dicarboxylic acid component used is not particularly limited, but it may be 5% by mole or less, 4% by mole or less, 3% by mole or less, 2% by mole or less, or 1% by mole or less (e.g., 0 to 5% by mole, greater than 0 to 4.5% by mole, 0.5 to 4% by mole, 1 to 3% by mole, or 1.5 to 2% by mole), based on the total percent by mole of the dicarboxylic acid component. Accordingly, the crystalline polyester resin may comprise a repeat unit (w) derived from the second dicarboxylic acid component.

The crystalline polyester resin according to the present invention may further comprise a repeat unit (A) derived from a branching agent having 3 or more functional groups. By virtue of the branching agent, the crystalline polyester resin can have a high molecular weight and a high crystallinity as the repeat unit (A) is introduced into a side chain of the main chain, or a graft polymerization structure is formed by the repeat unit (A).

According to the present invention, the content of the repeat unit (A) contained in the crystalline polyester resin is not particularly limited, but it may be 0.001 to 15% by weight, 0.005 to 13% by weight, 0.01 to 12% by weight, 0.02 to 10% by weight, or 0.03 to 5% by weight, based on the total percent by weight of the diol repeat unit.

The branching agent is not particularly limited, but it may specifically be trimellitic acid, trimellitic anhydride, trimethylol propane, or a combination thereof.

According to the present invention, the crystalline polyester resin may have an intrinsic viscosity (IV) (at 35° C.) of 0.5 to 1.3 dl/g. Specifically, the intrinsic viscosity (IV) of the crystalline polyester resin at 35° C. may be 0.51 to 1.3 dl/g, 0.53 to 1.29 dl/g, 0.56 to 1.28 dl/g, 0.56 to 1.27 dl/g, 0.59 to 1.25 dl/g, or 0.6 to 1.25 dl/g.

According to the present invention, the crystalline polyester resin may have a fusion ratio of 5% or less according to the following Relationship 2. Specifically, the fusion ratio of the crystalline polyester resin may be 4.8% or less, 4.6% or less, 4.5% or less, 4.3% or less, 4% or less, 3.8% or less, 3.5% or less, 3.3% or less, 3% or less, 2.5% or less, 2.3% or less, 2% or less, 1.8% or less, 1.5% or less, 1% or less, 0.8% or less, 0.5% or less, 0.3% or less, or 0.1% or less (e.g., 0.001 to 5%, 0.005 to 4%, 0.01 to 3%, or 0.1 to 2%). As a result, the productivity of the crystalline polyester resin is very excellent while moldability (processability) can be secured during the molding process of the crystalline polyester resin.

$$\text{Fusion ratio (\%)} = (W_F/W_T) \times 100 \quad \text{[Relationship 2]}$$

In Relationship 2, $W_T$ is the total weight of the crystalline polyester resin produced per unit time (1 hr), and $W_F$ is the weight of the fused material generated per ton of the crystalline polyester resin produced.

The fused material is a material that cannot pass through a vibrator having a 12.5-mm mesh.

The crystalline polyester resin according to the present invention may be in the form (shape) of chips, pellets, or powder.

In addition, the crystalline polyester resin according to the present invention may be a homopolymer or a copolymer. Specifically, the crystalline polyester resin may be selected from the group consisting of polyethylene terephthalate (PET), polyethylene terephthalate glycol (PETG), polyester sulfone (PES), polybutylene terephthalate (PBT), polytrimethylene terephthalate (PTT), polybutylene adipate-co-terephthalate (PBAT), polypropylene adipate-co-terephthalate (PPAT), polycyclohexane dimethyl terephthalate (PCT), and thermoplastic polyester elastomer (TPEE).

Process for Preparing a Crystalline Polyester Resin

The process for preparing a crystalline polyester resin according to the present invention comprises (1) polymerizing a diol component and a dicarboxylic acid component to prepare a polyester resin; and (2) subjecting the polyester resin to crystallization of one or more times, wherein, when the crystalline polyester resin prepared through steps (1) and (2) is analyzed by differential scanning calorimetry (DSC) while the temperature is raised to 280° C. at a scan rate of 10° C./minute, two or more melting temperatures ($T_m$) appear, and the following Relationship 1 is satisfied. The process for preparing a crystalline polyester resin according to the present invention has the feature of controlling the crystallization temperature stepwise in step (2). As it is controlled to satisfy the following Relationship 1, it is possible to prepare a crystalline polyester resin having excellent moldability and recyclability. Hereinafter, this will be described in detail by referring to FIG. 1. Here, the description of the following Relationship 1 is the same as described above and, therefore, will be omitted.

$$4 < X/Y < 70 \quad \text{[Relationship 1]}$$

In Relationship 1, X is the sum of the heats of fusion ($\Delta H$) at the melting temperatures appearing at 200° C. or higher, and Y is the sum of the heats of fusion ($\Delta H$) at the melting temperatures appearing at lower than 200° C.

Step (1): Preparation of a Polyester Resin

Step (1) is a step of subjecting a diol component and a dicarboxylic acid component to an esterification reaction (or transesterification reaction) to obtain a reactant (e.g., oligomer), which is then subjected to a polycondensation reaction to prepare a polyester resin (e.g., a polyester resin whose surface is not crystalline). Here, since the diol component and the dicarboxylic acid component are the same as described above, a detailed description thereon is omitted.

The conditions under which the esterification reaction (or transesterification reaction) is carried out may not be particularly limited. Specifically, the temperature at which the esterification reaction is carried out may be 220 to 300° C., 225 to 290° C., 230 to 280° C., 235 to 275° C., 240 to 270° C., or 245 to 265° C. In addition, the pressure at which the esterification reaction is carried out may be 0.05 to 5 kgf/cm², 0.1 to 4 kgf/cm², 0.1 to 3 kgf/cm², 0.5 to 2.5 kgf/cm², or 1 to 2 kgf/cm². As the esterification reaction is carried out under the above conditions, the production of side reactants is minimized while a reactant (oligomer) having the desired molecular weight can be obtained in high yield.

In addition to the diol component and the dicarboxylic acid component, at least one additive selected from the group consisting of a catalyst, a colorant, a crystallizing agent, an antioxidant, and a branching agent may be fed to the reactor in which the esterification reaction (or transesterification reaction) is carried out.

The catalyst may be methylates of sodium and magnesium; acetates, borates, fatty acid salts, or carbonates of Ge, Zn, Cd, Mn, Co, Ca, and Ba; and oxides or hydrates of Ge, Mg, Pb, Mn, Ti, Sb, Sn, and Al. For example, the catalyst may be tetraethyl titanate, acetyltripropyl titanate, tetrapropyl titanate, tetrabutyl titanate, 2-ethylhexyl titanate, octylene glycol titanate, triethanolamine titanate, acetylacetonate titanate, ethylacetoacetic ester titanate, isostearyl titanate, titanium dioxide, germanium dioxide, germanium tetrachloride, germanium ethyleneglycoxide, germanium acetate, or combinations thereof.

As the colorant, organic compounds such as cobalt-based compounds, anthraquinone-based compounds, perinone-based compounds, azo-based compounds, and methine-based compounds (for example, cobalt acetate, cobalt propionate, Polysynthren Blue RLS toner of Clariant, and Solvaperm Red BB toner of Clariant) may be used.

As the crystallizing agent, a crystal nucleating agent, an ultraviolet absorber, a polyolefin resin, a polyamide resin, or the like may be used.

As the antioxidant, hindered phenol-based compounds, phosphite-based compounds, thioether-based compounds, or the like may be used.

As the branching agent, trimellitic acid, trimellitic anhydride, trimethylol propane, or a combination thereof as described above may be used.

The reactant obtained through the esterification reaction (or transesterification reaction) may then be fed to a polycondensation reactor to carry out a polycondensation reaction. The conditions under which the polycondensation reaction is carried out may not be particularly limited. Specifically, the temperature at which the polycondensation reaction is carried out may be 240 to 320° C., 245 to 310° C., 250 to 300° C., 255 to 295° C., or 265 to 290° C. In addition, the pressure at which the polycondensation reaction is carried out may be lower (reduced pressure) than normal pressure (e.g., 1 atm). As the polycondensation reaction is carried out under the above conditions, a polyester resin (polymer) having excellent moldability (processability) can be efficiently produced.

Thereafter, the polyester resin obtained through the polycondensation reaction may be pelletized through procedures such as extrusion and underwater cutting. That is, the polyester resin may be polyester resin pellets.

The polyester resin (e.g., polyester resin pellets) obtained through step (1) described above may be subjected to step (2) described below to have the desired crystallinity. Here, the polyester resin may be subjected to a drying process before being subjected to step (2) described below. That is, the process for preparing a crystalline polyester resin according to the present invention may further comprise a step of drying the polyester resin obtained in step (1) between step (1) and step (2) in order to further optimize the crystallinity of the crystalline polyester resin while preventing fusion between the polyester resins.

Drying of the polyester resin may be carried out in a conventionally known dryer (e.g., a fluidized bed-type dryer). The conditions under which the drying is carried out are not particularly limited, but the drying may be carried out at 40 to 90° C. (specifically, 40 to 85° C., 45 to 85° C., 50 to 80° C., or 50 to 70° C.) for 3 to 12 hours (specifically, 4 to 12 hours or 5 to 11 hours) when the drying efficiency and productivity of the polyester resin are taken into consideration.

Step (2): Preparation of a Crystalline Polyester Resin Through Crystallization

Step (2) is a step of subjecting the polyester resin obtained in step (1) to crystallization of one or more times. Specifically, the crystallization of the polyester resin may be carried out two or more times, three or more times, or four or more times.

According to the present invention, the temperature at which the crystallization is carried out is not particularly limited, but it may be 105 to 185° C. (specifically, 106 to 184° C., 107 to 183° C., 108 to 182° C., 109 to 181° C., or 110 to 180° C.). As the crystallization is carried out within the above range, a crystalline polyester resin with an optimized crystallinity can be prepared while fusion between the polyester resins during the crystallization procedure is minimized.

In addition, according to the present invention, the crystallization may be carried out under temperature conditions that increase stepwise. Specifically, when the crystallization is carried out in the first and second stages, the second crystallization temperature ($T_2$) may be higher than the first crystallization temperature ($T_1$) ($T_1<T_2$). In addition, when the crystallization is carried out in the first to third stages, the third crystallization temperature ($T_3$) may be higher than the second crystallization temperature ($T_2$), and the second crystallization temperature ($T_2$) may be higher than the first crystallization temperature ($T_1$) ($T_1<T_2<T_3$). As the crystallization is carried out under temperature conditions that increase stepwise, a crystalline polyester resin with an optimized crystallinity can be prepared while fusion between the polyester resins during the crystallization procedure is minimized.

According to the present invention, step (2) may specifically comprise (2-1) subjecting the polyester resin of step (1) to a first crystallization at 105 to 135° C. (specifically, 108 to 133° C. or 110 to 130° C.); (2-2) subjecting the polyester resin crystallized in step (2-1) to a second crystallization at 120 to 175° C. (specifically, 120 to 170° C. or 125 to 155° C.); and (2-3) subjecting the polyester resin crystallized in step (2-2) to a third crystallization at 140 to 180° C. (specifically, 145 to 180° C. or 150 to 180° C.). As the crystallization is carried out in three stages and each crystallization temperature is controlled within the above specific range, crystals are uniformly formed inside and outside of the polyester resin, while it is possible to minimize fusion between the polyester resins caused by surface melting during the crystallization procedure. Accordingly, a polyester resin with an optimized crystallinity can be efficiently prepared (with enhanced productivity), thereby providing a crystalline polyester resin with excellent moldability and recyclability.

Here, the first crystallization temperature, the second crystallization temperature, and the third crystallization temperature may be different from each other.

The crystallization may be carried out under conditions of normal pressure or reduced pressure. A commonly known fluidizing agent may be added to the crystallization procedure to increase the fluidity of the polyester resin (polyester resin pellets).

The crystalline polyester resin prepared through crystallization in step (2) as described above may be further subjected to a commonly known solid-state polymerization procedure as needed to control viscosity and molecular weight.

Article

The article according to the present invention is prepared from the crystalline polyester resin described above. Specifically, the article according to the present invention may be prepared by subjecting the crystalline polyester resin to a molding process such as injection molding, extrusion molding, extrusion blow molding, injection blow molding, pressure molding, or vacuum molding. For example, the article may be an injection-molded article prepared through injection molding.

Since the article is prepared from the crystalline polyester resin described above, it may have excellent quality (e.g., thermal resistance, mechanical strength, appearance, and the like). In addition, since the article is prepared from the crystalline polyester resin described above, the efficiency of a recycling process may also be excellent when the recycling process is carried out after the completion of use.

The article is not particularly limited, but it may be a film; a sheet; or a small or large container (e.g., a container for cosmetics, food, or the like).

MODE FOR THE INVENTION

Hereinafter, the present invention will be described in more detail with reference to embodiments. However, these examples are provided only for illustration purposes, and the present invention is not limited thereto.

Example 1

Step (1): Preparation of a Polyester Resin

A reactor equipped with a column and a condenser that can be cooled by water was charged with recycled bis-2-hydroxyethyl terephthalate (r-BHET, 2,515.3 kg), terephthalic acid (TPA, 6,575.6 kg), isosorbide (ISB, 309.8 kg), ethylene glycol (EG, 2,624.5 kg), 1,4-cyclohexanedimethanol (CHDM, 633.8 kg), diethylene glycol (DEG, 70.0 kg), a Ge catalyst (1.0 kg), a Ti catalyst (1.0 kg), phosphoric acid (1.5 kg), a blue toner (0.01 kg), and a red toner (0.005 kg). Next, after the temperature of the reactor was raised to 265° C., an esterification reaction (ES) was carried out at 265° C. under a pressure of 2 kgf/cm² to obtain a transparent reactant.

Subsequently, the reactant was transferred to a polycondensation reactor, and a polycondensation reaction (PA) was then carried out at 270° C. while the pressure of the polycondensation reactor was maintained at a pressure lower than normal pressure. When the intrinsic viscosity (melt intrinsic viscosity) (IV) of the reactant in the polycondensation reactor reached 0.60 dl/g, the reactant was then discharged to the outside of the polycondensation reactor to form strands. Subsequently, they were solidified with a cooling liquid and then pelletized such that the average weight of 100 pellets was approximately 1.0 to 2.5 g, thereby obtaining polyester resin pellets.

Thereafter, the polyester resin pellets thus obtained were dried at 50° C. for 10 hours before crystallization.

Step (2): Crystallization of the Polyester Resin

The dried polyester resin pellets were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 110° C., the second crystallization of the first crystallized polyester resin pellets was carried out at 130° C., and the third crystallization of the second crystallized polyester resin pellets was carried out at 165° C.

Example 2

Step (1): Preparation of a Polyester Resin

A reactor equipped with a column and a condenser that can be cooled by water was charged with terephthalic acid (TPA, 8,462.5 kg), ethylene glycol (EG, 4,874.5 kg), 1,4-cyclohexanedimethanol (CHDM, 326.3 kg), diethylene glycol (DEG, 72.1 kg), a Ti catalyst (1.0 kg), phosphoric acid (1.5 kg), a blue toner (0.01 kg), and a red toner (0.01 kg). Next, after the temperature of the reactor was raised to 255° C., an esterification reaction (ES) was carried out at 255° C. under a pressure of 1 kgf/cm$^2$ to obtain a transparent reactant.

Subsequently, the reactant was transferred to a polycondensation reactor, and a polycondensation reaction (PA) was then carried out at 285° C. while the pressure of the polycondensation reactor was maintained at a pressure lower than normal pressure. When the intrinsic viscosity (melt intrinsic viscosity) (IV) of the reactant in the polycondensation reactor reached 0.50 dl/g, the reactant was then discharged to the outside of the polycondensation reactor to form strands. Subsequently, they were solidified with a cooling liquid and then pelletized such that the average weight of 100 pellets was approximately 1.0 to 2.5 g, thereby obtaining polyester resin pellets.

Step (2): Crystallization of the Polyester Resin

The polyester resin pellets (not dried) were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 115° C., the second crystallization of the first crystallized polyester resin pellets was carried out at 120° C., and the third crystallization of the second crystallized polyester resin pellets was carried out at 160° C.

Example 3

Step (1): Preparation of a Polyester Resin

A reactor equipped with a column and a condenser that can be cooled by water was charged with recycled bis-2-hydroxyethyl terephthalate (r-BHET, 6,569.4 kg), terephthalic acid (TPA, 8,157.5 kg), isophthalic acid (IPA, 429.3 kg), ethylene glycol (EG, 2,180.8 kg), diethylene glycol (DEG, 109.7 kg), a Ge catalyst (1.0 kg), and phosphoric acid (1.5 kg). Next, after the temperature of the reactor was raised to 260° C., an esterification reaction (ES) was carried out at 260° C. under a pressure of 1 kgf/cm$^2$ to obtain a transparent reactant.

Subsequently, the reactant was transferred to a polycondensation reactor, and a polycondensation reaction (PA) was then carried out at 275° C. while the pressure of the polycondensation reactor was maintained at a pressure lower than normal pressure. When the intrinsic viscosity (melt intrinsic viscosity) (IV) of the reactant in the polycondensation reactor reached 0.78 dl/g, the reactant was then discharged to the outside of the polycondensation reactor to form strands. Subsequently, they were solidified with a cooling liquid and then pelletized such that the average weight of 100 pellets was approximately 1.0 to 2.5 g, thereby obtaining polyester resin pellets.

Thereafter, the polyester resin pellets thus obtained were dried at 40° C. for 9 hours before crystallization.

Step (2): Crystallization of the Polyester Resin

The dried polyester resin pellets were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 120° C., the second crystallization of the first crystallized polyester resin pellets was carried out at 135° C., and the third crystallization of the second crystallized polyester resin pellets was carried out at 150° C.

Example 4

Step (1): Preparation of a Polyester Resin

A reactor equipped with a column and a condenser that can be cooled by water was charged with recycled bis-2-hydroxyethyl terephthalate (r-BHET, 5,125.6 kg), terephthalic acid (TPA, 5,024.7 kg), isosorbide (ISB, 52.6 kg), ethylene glycol (EG, 2,229.7 kg), 1,4-cyclohexanedimethanol (CHDM, 484.3 kg), diethylene glycol (DEG, 71.3 kg), a Ge catalyst (1.0 kg), phosphoric acid (1.5 kg), cobalt acetate (0.4 kg), a blue toner (0.03 kg), and a red toner (0.01 kg). Next, after the temperature of the reactor was raised to 250° C., an esterification reaction (ES) was carried out at 250° C. under a pressure of 1 kgf/cm$^2$ to obtain a transparent reactant.

Subsequently, the reactant was transferred to a polycondensation reactor, and a polycondensation reaction (PA) was then carried out at 285° C. while the pressure of the polycondensation reactor was maintained at a pressure lower than normal pressure. When the intrinsic viscosity (melt intrinsic viscosity) (IV) of the reactant in the polycondensation reactor reached 0.85 dl/g, the reactant was then discharged to the outside of the polycondensation reactor to form strands. Subsequently, they were solidified with a cooling liquid and then pelletized such that the average weight of 100 pellets was approximately 1.0 to 2.5 g, thereby obtaining polyester resin pellets.

Step (2): Crystallization of the Polyester Resin

The polyester resin pellets (not dried) were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 110° C., the second crystallization of the first crystallized polyester resin pellets was carried out at 170° C., and the third crystallization of the second crystallized polyester resin pellets was carried out at 180° C.

Example 5

Step (1): Preparation of a Polyester Resin

Polyester resin pellets were obtained through the same procedure as in Example 1. Thereafter, the polyester resin pellets thus obtained were dried at 55° C. for 4 hours before crystallization.

Step (2): Crystallization of the Polyester Resin

The dried polyester resin pellets were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 125° C., the second crystallization of the first crystallized polyester resin pellets was carried out at 130° C., and the third crystallization of the second crystallized polyester resin pellets was carried out at 140° C.

Example 6

Step (1): Preparation of a Polyester Resin
Polyester resin pellets were obtained through the same procedure as in Example 3.
Step (2): Crystallization of the Polyester Resin
The polyester resin pellets (not dried) were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 130° C., the second crystallization of the first crystallized polyester resin pellets was carried out at 150° C., and the third crystallization of the second crystallized polyester resin pellets was carried out at 180° C.

Comparative Example 1

Step (1): Preparation of a Polyester Resin
Polyester resin pellets were obtained through the same procedure as in Example 3.
Step (2): Crystallization of the Polyester Resin
The polyester resin pellets (not dried) were fed to a crystallization reactor at a rate of 1 ton per hour (feeding rate: 1 ton/hr), and a crystallization procedure was carried out three times while the temperature was lowered according to the moving position of the polyester resin pellets, thereby obtaining a crystalline polyester resin. In such an event, the first crystallization of the polyester resin pellets was carried out at 160° C., the second crystallization of the first crystallized polyester resin pellets was carried out at 140° C., and the third crystallization of the second crystallized polyester resin pellets was carried out at 120° C.

Comparative Example 2

Step (1): Preparation of a Polyester Resin
Polyester resin pellets were obtained through the same procedure as in Example 3. Thereafter, the polyester resin pellets thus obtained were dried at 55° C. for 3 hours before crystallization.
Step (2): Crystallization of the Polyester Resin
The dried polyester resin pellets were fed to a crystallization reactor at a rate of 1 ton per hour (feeding rate: 1 ton/hr), and a crystallization procedure was carried out three times while the temperature was raised according to the moving position of the polyester resin pellets, thereby obtaining a crystalline polyester resin. In such an event, the first crystallization of the polyester resin pellets was carried out at 140° C., the second crystallization of the first crystallized polyester resin pellets was carried out at 160° C., and the third crystallization of the second crystallized polyester resin pellets was carried out at 200° C.

Comparative Example 3

Step (1): Preparation of a Polyester Resin
Polyester resin pellets were obtained through the same procedure as in Example 4.
Step (2): Crystallization of the Polyester Resin
The polyester resin pellets (not dried) were fed to a crystallization reactor at a rate of 1 ton per hour (feeding rate: 1 ton/hr), and a crystallization procedure was carried out while the temperature was raised according to the moving position of the polyester resin pellets, thereby obtaining a crystalline polyester resin. In such an event, the first crystallization of the polyester resin pellets was carried out at 100° C., the second crystallization of the first crystallized polyester resin pellets was carried out at 160° C., and the third crystallization of the second crystallized polyester resin pellets was carried out at 190° C.

Comparative Example 4

Step (1): Preparation of a Polyester Resin
Polyester resin pellets were obtained through the same procedure as in Example 1.
Step (2): Crystallization of the Polyester Resin
The polyester resin pellets (not dried) were fed to a crystallization reactor at a rate of 1 ton per hour (feeding rate: 1 ton/hr), and a crystallization procedure was carried out once at 170° C., thereby obtaining a crystalline polyester resin.

Comparative Example 5

Step (1): Preparation of a Polyester Resin
Polyester resin pellets were obtained through the same procedure as in Example 3. Thereafter, the polyester resin pellets thus obtained were dried at 40° C. for 3 hours before crystallization.
Step (2): Crystallization of the Polyester Resin
The dried polyester resin pellets were fed to a crystallization reactor at a rate of 1 ton per hour (feeding rate: 1 ton/hr), and a crystallization procedure was carried out twice while the temperature was raised according to the moving position of the polyester resin pellets, thereby obtaining a crystalline polyester resin. In such an event, the first crystallization of the polyester resin pellets was carried out at 70° C., and the second crystallization of the first crystallized polyester resin pellets was carried out at 160° C.

Test Example 1

The crystalline polyester resins prepared in Examples 1 to 6 and Comparative Examples 1 to 5 were each analyzed by differential scanning calorimetry (DSC) to determine whether a melting temperature ($T_m$) appeared. The results are shown in Tables 1 and 2 below. The DSC analysis was carried out as follows.
DSC analysis device: DSC 1 model of Mettler Toledo was used.
Sample preparation: About 6 to 10 mg of each crystalline polyester resin was taken and filled into an aluminum pan.
Scan conditions: It was heated from room temperature to 280° C. at a rate of 10° C./minute, followed by annealing at 280° C. for 3 minutes to obtain a DSC curve.
Confirmation of melting temperature ($T_m$): The temperature at which an endothermic peak appeared during the temperature elevation procedure in the obtained DSC curve was defined as the melting temperature. Thereafter, the heat of fusion ($\Delta H$) and the X/Y ratio (rounded to the second decimal place) were calculated using the melting temperature ($T_m$).

Test Example 2

The weight (kg) of the fused material generated per ton for the total production (kg/hr) was measured, and the fusion ratio was then calculated according to the following Relationship 2. The results are shown in Tables 1 and 2 below.

Fusion ratio (%)=($W_F/W_T$)×100   [Relationship 2]

In Relationship 2, $W_T$ is the total weight of the crystalline polyester resin produced per unit time (1 hr) (total production), and $W_F$ is the weight of the fused material generated per ton of the crystalline polyester resin produced (the total production was divided into 1 ton each to be divided as crystalline polyester resin samples, and the weight of the fused material contained in the sample was measured).

The fused material (polyester resin fused material) is a material that cannot pass through a vibrator having a 12.5-mm mesh.

Test Example 3

The crystalline polyester resins prepared in Examples 1 to 6 and Comparative Examples 1 to 5 were each injection-molded at a temperature of 250 to 260° C. using an ENGEL 25 device to prepare an injection-molded specimen with a length of 100 mm, a width of 100 mm, and a thickness of 3 mm. It was evaluated for moldability according to the following criteria. The results are shown in Tables 1 and 2 below.

◎: No fish-eye and un-melt (a state where resin pellets were not melted) in the injection-molded specimen, and a continuous injection process was possible ○: No un-melt and 1 or less fish-eye in the injection molded specimen, and a continuous injection process was possible Δ: Two or more un-melts and fish-eyes in the injection specimen, while a continuous injection process was possible x: Fusion occurred between resin pellets, making a continuous injection process impossible

TABLE 1

| | | Ex. 1 | Ex. 2 | Ex. 3 | Ex. 4 | Ex. 5 | Ex. 6 |
|---|---|---|---|---|---|---|---|
| Crystallization temp. (° C.) | First crystallization | 110 | 115 | 120 | 110 | 125 | 130 |
| | Second crystallization | 130 | 120 | 135 | 170 | 130 | 150 |
| | Third crystallization | 165 | 160 | 150 | 180 | 140 | 180 |
| Fusion ratio | | 1 | 0.5 | 0.5 | 3 | 4 | 2 |
| Lower than 200° C. | $T_{m1-1}$ | 170.2 | 165.9 | 140.2 | 155.2 | 165.23 | 180.2 |
| | ΔH at $T_{m1-1}$ | 2.7 | 1.1 | 3.44 | 4.4 | 0.25 | 0.3 |
| | $T_{m1-2}$ | — | 190.4 | — | — | 189.2 | — |
| | ΔH at $T_{m1-2}$ | — | 6.5 | — | — | 0.5 | — |
| | Sum (Y) of ΔH | 2.7 | 7.6 | 3.44 | 4.4 | 0.75 | 0.3 |
| 200° C. or higher | $T_{m2}$ | 227.7 | 230.62 | 238.6 | 230.1 | 227.52 | 235.1 |
| | ΔH at $T_{m2}$ | 25.37 | 31.13 | 37.51 | 30.5 | 24.13 | 20.3 |
| | Sum (X) of ΔH | 25.37 | 31.13 | 37.51 | 30.5 | 24.13 | 20.3 |
| X/Y | | 9.4 | 4.1 | 10.9 | 6.9 | 32.2 | 67.7 |
| Moldability | | ◎ | ◎ | ◎ | ○ | ○ | ◎ |

TABLE 2

| | | C. Ex. 1 | C. Ex. 2 | C. Ex. 3 | C. Ex. 4 | C. Ex. 5 |
|---|---|---|---|---|---|---|
| Crystallization temp. (° C.) | First crystallization | 160 | 140 | 100 | 170 | 70 |
| | Second crystallization | 140 | 160 | 160 | — | 160 |
| | Third crystallization | 120 | 200 | 190 | — | — |
| Fusion ratio | | 7 | 10 | 21 | 70 | 40 |
| Lower than 200° C. | $T_{m1-1}$ | 155.2 | — | — | Fusion occurred between resin pellets (Crystallization not possible) | — |
| | ΔH at $T_{m1-1}$ | 0.5 | | | | |
| | $T_{m1-2}$ | — | | | | |
| | ΔH at $T_{m1-2}$ | | | | | |
| | Sum (Y) of ΔH | 0.5 | | | | |
| 200° C. or higher | $T_{m2}$ | 236.5 | — | 210.5 | | 234 |
| | ΔH at $T_{m2}$ | 38.2 | | 10.1 | | 9.8 |
| | Sum (X) of ΔH | — | 237.1 | 237.1 | | — |
| | $T_{m1-1}$ | | 35.5 | 25.5 | | — |
| | ΔH at $T_{m1-1}$ | 38.2 | 35.5 | 35.6 | | 9.8 |
| X/Y | | 76.4 | — | — | | — |
| Moldability | | Δ | Δ | x | Moldability evaluation not possible | x |

Referring to Table 1 above, the crystalline polyester resins of Examples 1 to 6 according to the present invention had a very low fusion ratio of 5% or less during the crystallization procedure and an X/Y ratio controlled within the range of the present invention, thereby having excellent productivity and moldability, along with an optimized crystallinity.

In contrast, referring to Table 2 above, in the crystalline polyester resin of Comparative Example 1, in which crystallization took place under the conditions of a stepwise temperature decrease, and the crystalline polyester resins of Comparative Examples 2 and 3, in which crystallization temperatures were outside the range of the present invention, the fusion ratios exceeded 5%, resulting in poor productivity of the crystalline polyester resins. Further, it was confirmed that in Comparative Examples 1 to 3, fish-eye and un-melt were formed during the injection molding process due to excessive crystallization, resulting in poor moldability. In addition, in the crystalline polyester resin of Comparative Example 4, in which crystallization was carried out once at a low temperature, and the crystalline polyester resin of Comparative Example 5, in which crystallization was carried out twice (showing translucency due to insufficient crystallization), the fusion ratios were very high during the crystallization procedure, and crystallization was impossible or insufficient. In addition, in Comparative Example 5, fusion took place between the crystalline polyester resins, resulting in poor moldability.

The invention claimed is:

1. A crystalline polyester resin, which comprises a diol repeat unit derived from a diol component; and a dicarboxylic acid repeat unit derived from a dicarboxylic acid component, wherein, when the crystalline polyester resin is analyzed by differential scanning calorimetry (DSC) while the temperature is raised to 280° C. at a scan rate of 10° C./minute, two or more melting temperatures ($T_m$) appear, and the following Relationship 1 is satisfied:

$$4<X/Y<70 \quad \text{[Relationship 1]}$$

in Relationship 1, X is the sum of the heats of fusion ($\Delta H$) at the melting temperatures appearing at 200° C. or higher, and Y is the sum of the heats of fusion ($\Delta H$) at the melting temperatures appearing at lower than 200° C.

2. The crystalline polyester resin of claim 1, wherein the melting temperatures ($T_m$) are 140 to 245° C.

3. The crystalline polyester resin of claim 1, wherein, in the DSC analysis of the crystalline polyester resin, a first melting temperature ($T_{m1}$) appears at a temperature of lower than 200° C., and a second melting temperature ($T_{m2}$) appears at a temperature of 200° C. or higher, wherein the difference ($|T_{m1}-T_{m2}|$) between the first melting temperature ($T_{m1}$) and the second melting temperature ($T_{m2}$) is 40 to 105° C.

4. The crystalline polyester resin of claim 1, wherein the sum (X) of the heats of fusion ($\Delta H$) at the melting temperatures appearing at 200° C. or higher is 20 J/g or more, and wherein the sum (Y) of the heats of fusion ($\Delta H$) at the melting temperatures appearing at lower than 200° C. is 0.1 to 10 J/g.

5. The crystalline polyester resin of claim 1, wherein the dicarboxylic acid component comprises at least one selected from the group consisting of terephthalic acid, isophthalic acid, dimethyl phthalate, dimethyl isophthalate, dimethyl terephthalate, phthalic acid, phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, azelaic acid, recycled terephthalic acid, recycled dimethyl terephthalate, recycled isophthalic acid, and recycled phthalic acid.

6. The crystalline polyester resin of claim 1, wherein the dicarboxylic acid component comprises at least one selected from the group consisting of a first dicarboxylic acid component comprising terephthalic acid, dimethyl phthalate, dimethyl isophthalate, dimethyl terephthalate, recycled terephthalic acid, recycled dimethyl terephthalate, or a combination thereof; and a second dicarboxylic acid component comprising isophthalic acid, phthalic acid, phthalic anhydride, 1,4-cyclohexane dicarboxylic acid, 1,3-cyclohexane dicarboxylic acid, dimethyl 1,4-cyclohexane dicarboxylate, dimethyl 1,3-cyclohexane dicarboxylate, recycled isophthalic acid, recycled phthalic acid, or a combination thereof.

7. The crystalline polyester resin of claim 6, wherein the amount of the second dicarboxylic acid component used is 5% by mole or less based on the total percent by mole of the dicarboxylic acid component.

8. The crystalline polyester resin of claim 1, wherein the diol component comprises at least one selected from the group consisting of bis-2-hydroxyethyl terephthalate, isosorbide, neopentyl glycol, ethylene glycol, diethylene glycol, cyclohexanedimethanol, 1,2-propanediol, 1,3-propanediol, 2-methyl-1,3-propanediol, 2-methylene-1,3-propanediol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, 4-(hydroxymethyl)cyclohexylmethyl-4-(hydroxymethyl)cyclohexanecarboxylate, 4-(4-(hydroxymethyl)cyclohexylmethoxymethyl)cyclohexylmethanol, 2,2,4,4-tetramethyl-1,3-cyclobutanediol, recycled bis-2-hydroxyethyl terephthalate, recycled isosorbide, recycled neopentyl glycol, recycled ethylene glycol, recycled diethylene glycol, and recycled cyclohexanedimethanol.

9. The crystalline polyester resin of claim 1, wherein the diol component comprises at least one selected from the group consisting of a first diol component comprising ethylene glycol, recycled ethylene glycol, or a combination thereof; a second diol component comprising bis-2-hydroxyethyl terephthalate, recycled bis-2-hydroxyethyl terephthalate, or a combination thereof; and a third diol component comprising isosorbide, neopentyl glycol, diethylene glycol, cyclohexanedimethanol, recycled isosorbide, recycled neopentyl glycol, recycled diethylene glycol, recycled cyclohexanedimethanol, or a combination thereof.

10. The crystalline polyester resin of claim 9, wherein the amount of the third diol component used is 20% by mole or less based on the total percent by mole of the diol component.

11. The crystalline polyester resin of claim 1, wherein the fusion ratio according to the following Relationship 2 is 5% or less:

$$\text{Fusion ratio (\%)}=(W_F/W_T)\times 100 \quad \text{[Relationship 2]}$$

in Relationship 2, $W_T$ is the total weight of the crystalline polyester resin produced per unit time (1 hr), and $W_F$ is the weight of the fused material generated per ton of the crystalline polyester resin produced, wherein the fused material is a material that cannot pass through a vibrator having a 12.5-mm mesh.

12. The crystalline polyester resin of claim 1, which further comprises a repeat unit derived from a branching agent having 3 or more functional groups, and wherein the content of the repeat unit derived from the branching agent is 0.001 to 15% by weight based on the total percent by weight of the diol repeat unit.

13. The crystalline polyester resin of claim 1, which has an intrinsic viscosity (IV) of 0.5 to 1.3 dl/g.

14. A process for preparing a crystalline polyester resin, which comprises:
   (1) polymerizing a diol component and a dicarboxylic acid component to prepare a polyester resin; and
   (2) subjecting the polyester resin to crystallization of one or more times,
   wherein, when the crystalline polyester resin is analyzed by differential scanning calorimetry (DSC) while the temperature is raised to 280° C. at a scan rate of 10° C./minute, two or more melting temperatures ($T_m$) appear, and the following Relationship 1 is satisfied:

$4<X/Y<70$   [Relationship 1]

in Relationship 1, X is the sum of the heats of fusion (ΔH) at the melting temperatures appearing at 200° C. or higher, and Y is the sum of the heats of fusion (ΔH) at the melting temperatures appearing at lower than 200° C.

15. The process for preparing a crystalline polyester resin of claim 14, wherein the crystallization in step (2) is carried out in a temperature range of 105 to 185° C.

16. The process for preparing a crystalline polyester resin of claim 14, wherein the crystallization in step (2) is carried out under temperature conditions that increase stepwise.

17. The process for preparing a crystalline polyester resin of claim 14, wherein step (2) comprises:
   (2-1) subjecting the polyester resin of step (1) to a first crystallization at 105 to 135° C.;
   (2-2) subjecting the polyester resin crystallized in step (2-1) to a second crystallization at 120 to 175° C.; and
   (2-3) subjecting the polyester resin crystallized in step (2-2) to a third crystallization at 140 to 180° C.

18. The process for preparing a crystalline polyester resin of claim 14, which further comprises drying the polyester resin obtained in step (1) before step (2) is carried out.

19. An article, which is prepared from the crystalline polyester resin of claim 1.

20. The article of claim 19, wherein the article is an injection-molded article.

* * * * *